Patented Mar. 18, 1930

1,750,838

UNITED STATES PATENT OFFICE

HERMAN FUHRBERG AND CONRAD T. JOHNSON, OF SEATTLE, WASHINGTON

CLEANER

No Drawing.  Application filed March 5, 1927. Serial No. 173,213.

The invention is a composition of matter which may readily be applied to a surface and which will thoroughly remove all dirt or grease from the surface.

The object of the invention is to provide a substance for cleaning which may readily be applied, which will thoroughly remove dirt or grease and which will not injure the surface.

A further object of the invention is to provide a cleaner which may be supplied in a paste form.

A still further object of the invention is to provide a cleaner that may be supplied in either a paste or powder form.

And a still further object of the invention is to provide a cleaner which is composed of inexpensive substances so that it may be made and sold at a very low price.

The composition consists of a combination of flour and sodium carbonate, soap and water, having a very small percentage of a preservative such as thymol, zinc chloride, carbolic acid, or boric acid.

In preparing the composition we prefer to use 18 level tablespoonfuls of flour thoroughly mixed with 6 ounces of water until it is like a batter or heavy cream. It is thoroughly mixed so that it will be free of all lumps. This is then thoroughly mixed into one quart of boiling water. We then thoroughly mix 36 level tablespoonfuls of sodium carbonate and soap in one quart of luke warm water containing 23 grains of thymol. This solution is then thoroughly mixed into the former solution making 2 quarts of the substance. The substance may then be permitted to cool and packed in suitable containers.

It may also be supplied in powder form by wrapping the flour, sodium carbonate and soap in separate packages which may then be mixed as desired with the water as hereinbefore stated. The preservative may be omitted when it is supplied in this form.

Although we have specified flour it is understood that any other substance having substantially the same chemical composition may be used, and it is also understood that either sodium carbonate or soap or any other substance having substantially the same chemical properties may be used. Either of the preservatives hereinbefore specified may be used or any other suitable substance that will act as a preservative may also be used. When the thymol is used it would be used in the proportion of one part to 1340 parts, the zinc chloride in the proportion of one part to 909 parts, the carbolic acid in the proportion of one part to 333 parts, and the boric acid in the proportion of one part to 143 parts. These proportions are approximate and it is understood that any similar proportions may be used.

In use the substance may be spread on the wall, or any surface, with a brush as in painting, then wiped off with a sponge dipped in warm water and rinsed, then wiped with a clean dry cloth.

Having thus fully described the invention, what we claim as new and desire to secure by Letters Patent, is:

A composition of matter comprising a combination of flour, sodium carbonate, soap, water and thymol, the said ingredients being used in the following proportions; 18 level tablespoons full of flour, 6 ounces of water, 36 level tablespoons full of a composition of sodium carbonate and soap, 1 quart of luke warm water and 23 grains of thymol.

In witness whereof we affix our signatures.

HERMAN FUHRBERG.
CONRAD T. JOHNSON.